Sept. 7, 1965

D. D. KLINE 3,205,378

WELDING TIMING CIRCUIT

Filed Oct. 1, 1959

INVENTORS
Donald D. Kline
BY
Townsend and Townsend
attorneys

United States Patent Office 3,205,378
Patented Sept. 7, 1965

3,205,378
WELDING TIMING CIRCUIT
Donald D. Kline, Oakland, Calif., assignor to Hexcel Products Inc., Berkeley, Calif., a corporation of California
Filed Oct. 1, 1959, Ser. No. 843,771
11 Claims. (Cl. 307—112)

This invention relates to an electronic control circuit for distributing and timing pulses for resistance welding.

In the resistance welding of stainless steel and other metals the work and the welding electrodes are relatively moved to obtain a resistance welded row or line. In most devices the welded line is formed by a plurality of rapid pulses of welding energy. The welded line is thus formed by a series of closely spaced welded spots. It is important for conformity of welds that each pulse have a precisely controlled duration, and intensity. Furthermore, in such welding systems it is desirable to employ a plurality of welding electrodes in side by side relationship which are operated from a single welding power supply so that a plurality of parallel resistance welded lines may be simultaneously formed.

The power consumption required by each of the welding stations during its operating or welding phase is such as to make the power supply requirements prohibitedly high should more than one of the welding stations be in operative condition at any one instance.

It is the principal object of this invention to provide a new and improved welding timer to proportion welding pulses sequentially to the various welding stations and do so with sufficient accuracy and rapidity so that each station in the series of stations receives a controlled pulse within the requisite time limit for the welding operation involved.

Another object of this invention is to provide a welding control circuit which is operated from a direct current power supply so as to directly provide pulses from the D.C. source to the welding stations and to program the pulses in sequential order to a plurality of welding stations without using a stored energy mechanism.

Still another object of this invention is to provide all the pulses for each of the welding stations with a similar square waveform.

A further object of this invention is to provide a welding timer employing solid state devices which function to gate the welding energy to the welding stations and in which the solid state devices are caused to re-set to a condition of high resistance by the inductive application of a reverse potential on the line across the solid state devices after a predetermined time delay.

A feature and advantage of this invention is that the welding pulse generated has a substantially square wave form which has been found to be preferable in many welding operations.

A still further object of this invention is to provide a control circuit which regulates the pulse length for each welding station in accordance with the amount of current drawn by the welding station in such a manner that the welding pulse duration is inversely proportional to the intensity of the current, i.e., each welding station receives a welding pulse of equal power.

Another feature and advantage of the variable time control of the welding pulse in relation to the welding current is that the total amount of welding energy applied to each station is substantially similar even though the electrode to electrode resistance of a welding station or within a welding station during different pulse intervals may vary.

Still a further object of this invention is the provision of a novel device for imposing a reverse potential on solid state gating devices for welding stations which include the employment of a solid state gate for gating a stored potential of reverse polarity to be inductively applied on the circuit of the solid state welding gate.

A still further object of this invention is to provide a device capable of producing a high powered substantially rectangular wave form pulse.

Still another object of the invention is to provide a device for and a method of welding metal objects together by the use of a pulse of welding energy having a substantially rectangular wave form.

Other objects of the present invention will become apparent upon reading the following specification and referring to the accompanying drawings in which similar characters of reference represent corresponding parts in each of the several views.

In the drawings:

FIG. 1a is a block diagram showing in greater detail the analogue arithmetic circuit of FIG. 1.

Figure 1:
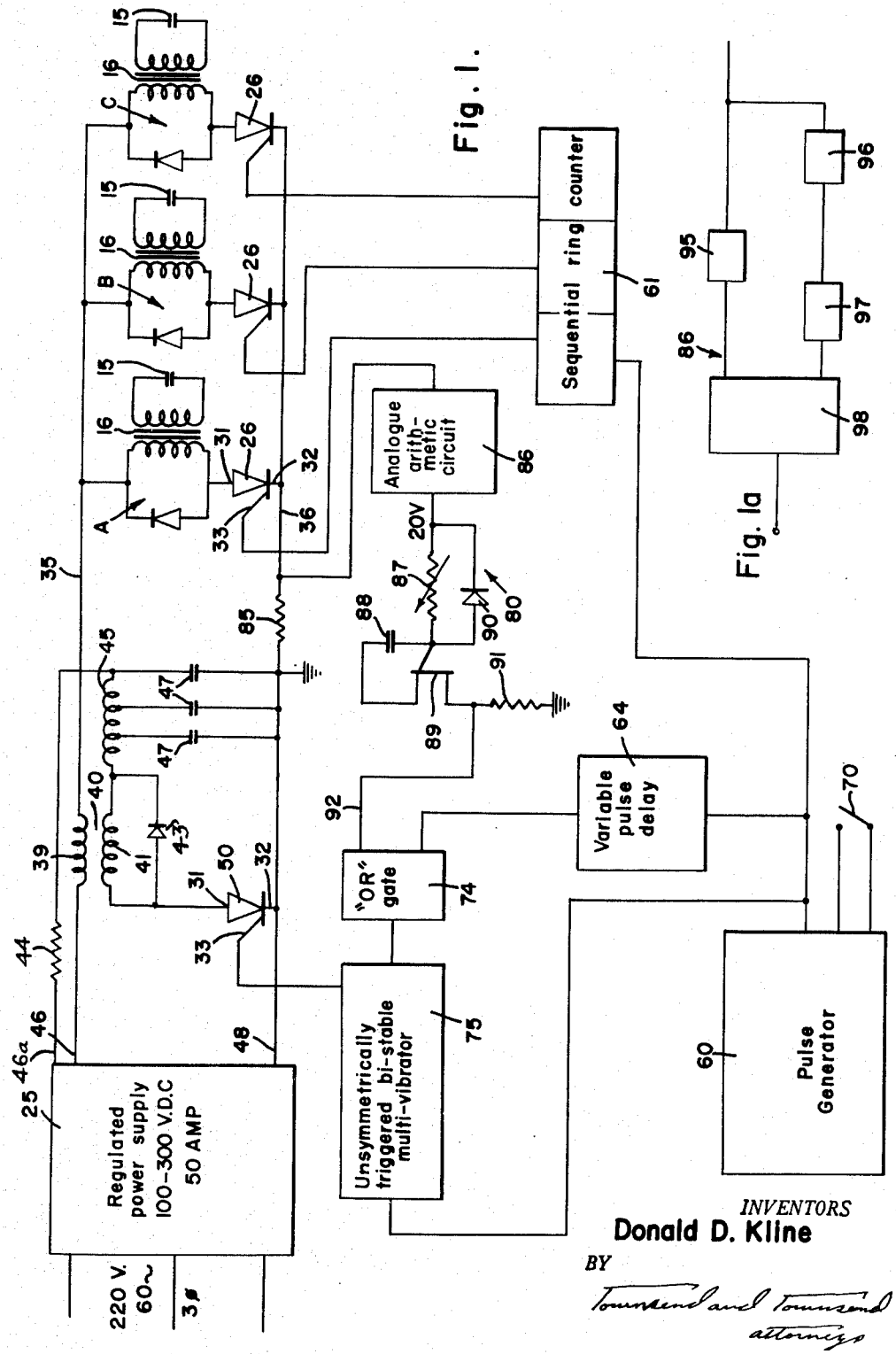
FIG. 1 is a schematic—block diagram of the principal embodiment of the invention.

Referring now to the drawings there is provided a welding timer and proportioning circuit in which there is provided a plurality of welding stations indicated generally at A, B and C.

The embodiment of FIG. 1 illustrates three welding stations. However, it is to be understood that the number of welding stations may be extended to any practical limit without in any way departing from the spirit and scope of this invention.

Each of the welding stations A, B and C comprises a pair of welding electrodes 15 which are connected directly to the secondary of a welding transformer 16. The primary of the welding transformer is connected to a regulated circuit current power supply indicated at 25. A solid state device 26 is connected in series with the primary of each of the welding transformers 16 and functions as a gate to cause the current from power supply 25 to pass through the primary of the welding transformer 16.

The solid state devices are semi-conductive elements which have the characteristic of normally having a high resistance between the two basic terminals. However, when a sufficient voltage of the proper polarity is applied across the solid state devices and when a trigger pulse is simultaneously applied to a control emitter of the device the device immediately goes into a state of low resistance and remains in that state until the current through the solid state device drops below the sustaining value. Such devices are termed silicon controlled rectifiers and are currently being manufactured by General Electric under the type designation ZJ39A and C35B and other devices under the C35 designation. For the purpose of this specification such devices are alternately designated as solid state device or trigger pulse actuate solid state device.

Each of the solid state devices 26 is provided with a positive terminal 31, a negative terminal 32 and a control element 33. One terminal of the primary of the welding transformer is connected to the positive bus 35 and the other terminal of the primary of the transformer is connected to positive terminal 31 of solid state device 26. The opposite or negative terminal 32 of the solid state device is connected to the negative bus 36.

Power supply 25 is arranged to produce sufficient voltage between buses 35 and 36 to cause the solid state devices to go into their low resistance state when the actuating or control element 33 is energized by a pulse of appropriate polarity and intensity. Thus each welding station A, B and C can be independently caused to conduct upon energizing control element 33 of solid state device 26 in the particular circuit. Any of the welding stations thereafter which are in the conductive state may be rendered non-conductive by droping the voltage between buses 35 and 36 to a point below which the current through the solid state device drops to a value below the sustaining value for the device. When the voltage drops below the sustaining value the solid state devices within the welding stations will be rendered non-conductive, that is, the solid state devices will be at their high resistance state.

The control circuit to actuate the lowering of the voltage between buses 35 and 36 comprises a pluse transformer 40 having its secondary in series with the power supply and bus 35. The primary 41 of transformer 40 has one terminal connected to a positive terminal 46ᵃ of power supply 25 through a resistor 44 and a tapped inductance 45. Tapped inductance 45 and a plurality of condensers 47 form a capacitive charging circuit. The opposite terminals of condensers 47 are connected directly to the negative terminal 48 of power supply 25. A diode 43 is connected across the primary 41.

A solid state device 50 identical to solid state device 26 is arranged with its positive terminal 31 connected to the opposite terminal of primary 41 and negative terminal 32 connected to negative terminal 48 of the power supply.

Resistor 44 functions to charge the condensers 47 which normally supply the voltage and current necessary to bias solid state device 50 to a point where the device will be rendered in the conductive or low resistance state upon its control element 33 being supplied with a suitable pulse. When control element 33 of solid state device 50 is appropriately energized solid state devices 50 will conduct thus closing the path between primary 41 of transformer 40 and the ground of the power supply wherein condensers 47 will discharge through solid state device 50 to ground. This causes a pulse to be generated on secondary 39 of transformer 40 which is fed across all the solid state devices 26 thus momentarily dropping current passage through the device to a level below the sustaining value required for the solid state device.

At the end portion of the pulse and when the solid state devices have been discharged the voltage across solid state device 50 then drops to a value sufficiently below the sustaining value required to retain solid state device 50 in the conductive state so that solid state device 50 also is rendered in the nonconductive state. Thus it can be seen in this circuit that an appropriate pulse applied on control element 33 of solid state device 50 will cause any of the bank of welding stations A, B and C to be gated off.

The control circuit to cause the resetting of the welding stations and the individual control of each of the welding stations is triggered by a pulse generator 60 which operates ring counter 61 to sequentially provide pulses for control elements 33 of the various solid state devices 26 and at the same time provides pulses through a delay 64 to trigger solid state device 50.

In greater detail pulse generator 60 is controlled by a switch 70 which functions as an off-on switch to start and stop pulse emission from the pulse generator. The pulse generator may be any type of generator which produces suitable pulse output such as a saw tooth or triangular wave form. The frequency of the pulses generated should be variable within the range of welding pulse frequency requirements.

Ring counter 61 is a sequential ring counter which can be actuated by a pulse input and which will advance one station upon receiving a trigger pulse from the pulse generator. Ring counter 61 is connected so that each of the stations is connected to a respective one of the control elements 33 of welding stations A, B and C so that when the ring counter is advanced to the appropriate stage that stage will trigger an associated solid state device 26.

Delay 64 is thence arranged to send the pulse to an "or" gate 74 and through the gate to a unsymmetrical, bistable multi-vibrator 75 and thence to control element 33 of resetting solid state device 50. The unsymmetrically triggered bi-stable multi-vibrator may be of any of the conventional designs for such a binary device and is connected to the output of pulse generator 60 so that each pulse causes multi-vibrator 75 to reset to a first condition and a subsequent pulse will cause the multi-vibrator 75 to change to the second state. The shift of multi-vibrator 75 from the first to the second conditions causes a pulse which will trigger control element 33 of solid state device 50. Thus in operation the pulse from generator 60, after causing the advancement of ring counter 61 and the subsequent triggering of a welding station A, B, and C, then causes the triggering of resetting device 50 after a predetermined time delay determined by the delay 64 which determines the maximum pulse duration for the welding device.

A control device generally indicated at 80 is arranged in combination with the "or" gate to also generate a pulse to "or" gate 74.

Control device 80 is also arranged to deliver a pulse to "or" gate 74 so as to cause the termination of the welding pulse prior to the time that the pulse would be terminated through the pulse from the variable delay 64. Delay 80 is arranged to be responsive to the amount of energy or power actually consumed or used in the welding station which is energized so that the device is arranged to sense the total welding power delivered to the station.

To accomplish this function a low value resistance 85 is placed in the negative leg of the power supply between the power supply and the welding station. Resistance 85 functions as a current sensing resistor. The proportional voltage developed across current sensing resistor 85 is applied to an analogue arithmetic circuit 86 which is designed to compute the power consumed in the welding stations according to the formula $P = EI - I^2R$ where P equals the power consumed by the welding station, E equals the voltage produced across lines 46 and 48, I is the current sensed at resistance 85 and R is the resistance which is in the circuit to the welding electrodes themselves. By the use of the arithmetic circuit for computing the power according to the above formula, it is possible to indicate the substantial amount of welding energy applied to the welds. The analogue arithmetic circuit 86 may be any of the conventional computing circuits and, for example, may comprise a computing circuit such as shown in FIG. 1a in which input from resistance 85 is fed to amplifier 95 having a gain equal to E. The output is simultaneously fed to a squaring circuit 96 and subsequently to an amplifier 97 with a gain of R. The outputs from amplifiers 95 and 97 are fed to a differential amplifier having a unitary gain. The resulting output from this circuit is an analogue of power derived from the formula set forth above.

The output of the analogue arithmetic circuit 86 is applied to an RC network consisting of a variable resistance 87 and a condenser 88 so as to charge condenser 88 at a rate determined by the RC time constant of the circuit and the value of the charging voltage.

A uni-junction transistor 89 is connected in a relaxation oscillator circuit including condenser 88, resistor 87, a diode 90, which shunts resistance 87, and a load resistor 91 between uni-junction transistor 89 and ground. The uni-junction transistor is arranged to emit a pulse through a line 92 to "or" gate 74 when the emitter of the uni-junction transistor reaches about −10 volts, for example.

The time delay between the application of a voltage from the arithmetic circuit until the RC circuit charges, as can be seen, is determined by the amount of current flow through resistance 85. Thus the delay of the pulse to "or" gate 74 is directly determined by the amount of welding energy used by the welding stations during the operating welding phase.

Figure 2:
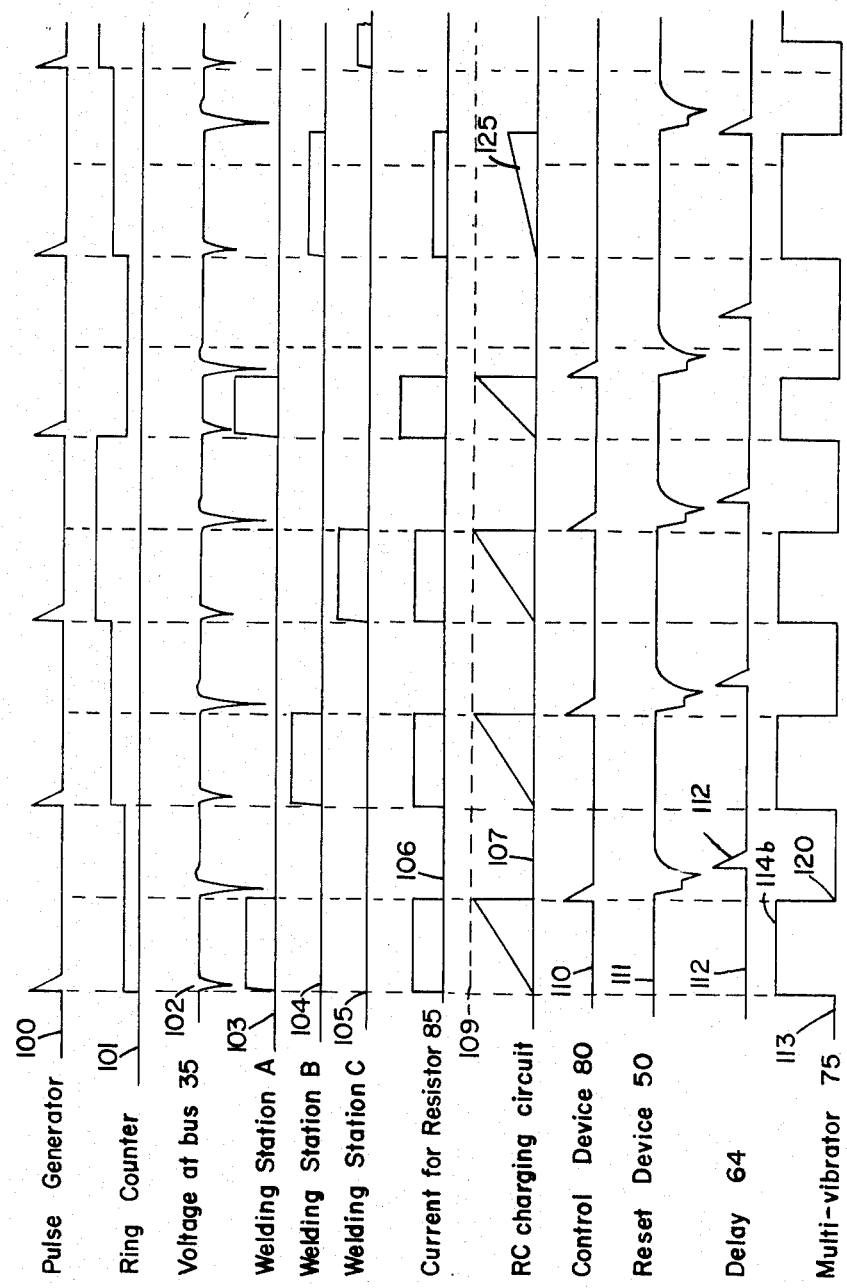
FIG. 2 is a timing chart showing the relative time relationships of the various elements and conditions of the same shown in FIG. 1.

The timing chart of FIG. 2 shows the relative timing cycle of the circuit in which reference line 100 indicates the output of the pulse generator. Reference line 101 indicates the output of the respective stations or ring counters 61, with each jog in relative elevation being indicative of a change of station. Line 102 indicates the voltage at bus 35 with the line indicating the normal positive potential on the line and with the reference above the line indicating a greater positive value and the reference below the line indicating a lesser positive value. Line 103 represents the current flow through welding station A. Line 104 indicates the current flow through welding station B. Line 105 indicates the current flow through welding station C. Line 106 indicates the current sensed by resistor 85. Line 107 indicates the rate of charging of the RC circuit of control device 80 in which the dotted reference line 109 indicates the value which will cause uni-junction transistor 89 to emit a pulse. Line 110 indicates the pulse output of control device 80. Line 111 indicates the voltage across the solid state device 50. Line 112 indicates the pulse output from delay device 64 and line 113 indicates the condition of multi-vibrator 75. The indication in the reference lines indicates the state of the multi-vibrator in a first condition and the second condition 114$^b$.

In operation multi-vibrator 75 is in the second condition. Pulse generator 60 then delivers a pulse as indicated on line 100. The pulse functions to cause ring counter 61 to advance as indicated at line 101. The output of the ring counter causes welding station A to be supplied with current. At the time that pulse generator 60 delivers the pulse, the pulse is also simultaneously applied to multi-vibrator 75 thus causing the multi-vibrator to go into the first condition of operation. As the current is continuously supplied to welding station A, condenser 88 is continuously charged until it reaches a value sufficient to cause uni-junction transistor 89 to issue a pulse as seen at line 112. The pulse is gated through "Or" gate 74 and to multi-vibrator 75. The multi-vibrator then shifts to the second condition which issues a pulse to control device 50 to cause the control device to go into the conductive state. When the control device is in the conductive state condensers 47 discharge through device 50 thus causing the voltage on bus 35 to be brought down to a point sufficient to cause welding station A to drop out of the latched or conductive state of operation as indicated at line 102.

When the control device A has turned off the reverse operation causes the voltage to drop across resetting device 50 as indicated at line 111 thus causing resetting device 50 to also drop below the requisite sustaining bias so that solid state device 50 goes into the unlatched or relatively non-conductive state.

When uni-junction transistor 89 delivers the pulse to multi-vibrator 75 the multi-vibrator is caused to go into its second state of operation as indicated at 120 on line 113 thus causing the multi-vibrator to be in a condition which would be non-responsive to the subsequent pulse indicated at 121 on line 112 from delay 64 so that the pulse from the delay is ineffective. Delay device 64 determines the maximum time interval that any particular welding station can be in operation. Thus if there is insufficient current sensed across resistor 85 during the maximum time limitations set by delay 64 then the pulse from delay 64 will pass through "or" gate 74 to cause the resetting or trigger pulse for solid state device 50. This condition can be seen at 125 on reference line 106 in which condenser 88 is to be incompletely charged before the output of the pulse from delay 64. In this case the output from delay 64 causes the triggering of solid state device 50 through the resetting of multi-vibrator 75.

It can thus be seen that control device 80 of the circuit functions to regulate the length of time that each welding station will be in operation within the maximum limit allowed by variable pulse delay 64. This feature is particularly important in view of the fact that the resistance between electrodes in the welding station vary from time to time depending, of course, on the electrical contact between the electrodes and the work and the electrical contacts between abutting faces of the work to be welded. By virtue of this circuit there is a substantially constant amount of welding energy applied to the work regardless of such resistance variations, the only limitations being the limitations set by delay device 64. The purpose of the maximum time limit is to provide for cases where there might be too wide a variation in resistance in the welding station to allow the device to operate within the cyclic interval determined by pulse generator 60. The circuit thus operates to sequentially select one of a series of welding stations to be supplied with welding energy for a time interval to be determined by the amount of welding energy consumed in the welding station and to thereafter gate the energized welding station off and gate a new welding station in the sequential order into the on position.

It is to be understood for purposes of claim terminology that the term trigger pulse actuated solid state device is intended to include semi-conductive or solid state devices of the type in which the device normally exhibits a high impedance which will change to a low impedance when there is both sufficient voltage stress across the solid state device and a sufficient trigger pulse whereinafter the impedance value of the device may be changed back to high impedance upon current flow through the device being lowered below a predetermined value.

Although the electronic device or control circuit has been described as primarily being useful in welding control devices it is obvious that the device could have other applications in areas where it is necessary to provide control over relatively high electrical energy output and particularly in cases where the high energy output should be in the form of single wave.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. In a welding control device the combination of: a plurality of welding stations; direct current supply means to supply welding current to the welding stations; gate means to gate the welding current from the supply means to each of the welding stations; first control means to advance upon being pulsed to cause said gates to sequentially gate respective welding stations in the on condition; second control means to cause all said gates to gate their respective welding stations in the off condition; pulse generating means to periodically pulse said first control means; delay means connected to said pulse generating means to actuate said second control a predetermined time delay after each pulse to said first control means and prior to the time for a subsequent pulse to said first control means; said second control means comprising charging means and means to discharge said charging means in series opposition to the welding supply current.

2. In a welding control device the combination of: a plurality of welding stations; direct current supply means to supply welding current to the welding stations; gate means to gate the welding current from the supply means to each of the welding stations; first control means to sequentially cause said gates to gate their respective welding stations in the on condition; second control means to simultaneously cause said gates to gate their respective welding stations in the off position; pulse generating means to periodically cause said first control means to sequentially advance to gate respective welding stations in the open position; current sensing means to sense the accumulated current drawn by said welding stations during the interval the stations are in the gated on condition; and third control means connected to said current sensing means to actuate said second control means after the current sensed by said current sensing means raises to a predetermined value.

3. In a welding control device the combination of: a plurality of welding stations; direct current supply means to supply welding current to the respective welding stations; gate means each including a trigger pulse actuated solid state device to gate welding current from said current supply means to the respective said welding stations; said current supply means connected to bias all said gate means with sufficient voltage stress to cause said gate means to be in the low impedance condition when and subsequent to being pulsed by a trigger pulse; gate resetting means to superpose a pulse of opposite potential on said current supply means to momentarily cause the voltage stress at all said gates to be below the voltage stress required to maintain said gates in a low impedance condition; pulse generating means; counter means connected to said pulse generating means to advance upon being pulsed by said pulse generating means; trigger pulse emitting means comprising said counter means to sequentially issue a trigger pulse to said gate means; delay means connected to said pulse generating means to actuate said gate resetting means a predetermined time delay after each pulse from said pulse generating means; said delay means having a delay shorter than the time differential between pulses from said pulse generating means; means to sense the total amount of current drawn by said welding stations during each time interval that a gate is gated on; second pulse generating means connected to said sensing means to issue a pulse when the accumulative current drawn by a welding station exceeds a predetermined value; and means to connect the first pulse from one of said delay means and said second pulse generating means to operate said gate resetting means and to disconnect the subsequent pulse from said gate resetting means.

4. In a welding control device the combination of: a plurality of welding stations; direct current supply means to supply welding current to the respective welding stations; gate means each including a first trigger pulse actuated solid state device to gate welding current from said current supply means to the respective said welding stations; said current supply means connected to bias all said gate means with sufficient voltage stress to cause said gate means to be in the low impedance condition when and subsequent to being pulsed by a trigger pulse; gate resetting means to superpose a pulse of opposite potentional on said current supply means to momentarily cause the voltage stress at all said gates to drop below the voltage stress required to maintain said gates in a low impedance condition; said gate resetting means including a pulse transformer having a secondary connected in series with the current supply means and a primary connected to capacitive storage means; high impedance means connected to said direct current supply and the primary of said pulse transformer to charge said capacitive storage means through the primary of the pulse transformer; a second trigger pulse actuated solid state device connected to discharge said capacitive storage means through the primary of said pulse transformer when in the low impedance condition; means comprising said capacitive storage means to bias said second solid state device with sufficient voltage stress to bias the device to the low impedance condition when and after being energized by a trigger pulse; said capacitive storage means connected to momentarily lower the voltage stress across said second solid state device when said gates return to the high impedance condition; and means to supply trigger pulse sequentially to each of said gate means and to apply a trigger pulse to said second solid state device during the time interval between pulses to each said gate means.

5. In a welding control device the combination of: a plurality of welding stations; direct current supply means to supply welding current to the welding stations; gate means to gate the welding current from the supply means to each of the welding stations; first control means to sequentially cause said gates to gate their respective welding stations in the on condition; second control means to cause said gates to gate their respective welding stations in the off position; pulse generating means to periodically cause said first control means to sequentially advance to gate respective welding stations in the open position; current sensing means to sense the accumulative current drawn by said welding stations during the interval the stations are in the gated on condition; third control means connected to said current sensing means to actuate said second control means after the current sensed by said current sensing means raises to a predetermined value; delay means actuated by said pulse generating means to actuate said second control means a predetermined time interval after each said gate has been gated to the on condition; and means to operably connect both said delay means and said third control means to said second control means and to operably disconnect both said delay means and said third control means from said second control means after one of said latter two means actuates said second control means.

6. In a welding control device the combination of: a plurality of welding stations; direct current supply means to supply welding current to the welding stations; gate means to gate the welding current from the supply means to each of the welding stations; counter means to selectively cause said gates to gate their respective welding stations in the on condition; gate reset means to simultaneously cause all said gates to gate their respective welding stations in the off position; pulse generating means to provide a pluse output having a fixed time interval between pulses connected to cause said counter means to sequentially pulse said gates to the on condition; delay means connected to said pulse generating means and to said gate reset means to actuate said gate reset means after a predetermined time interval after being pulsed by said pulse generating means; said predetermined time interval being less than the interval betwen pulses from said pulse generating means; current sensing means to sense the accumulative current drawn by a gated on welding station; control means operatively connected to said current sensing means to operate said gate reset means when the total current drawn by a gated on welding station is above a predetermined value; and means to connect said delay means and said control means to said reset means; and switching means actuated by said delay means and said control means to disconnect both said delay means and control means from operative engagement with gate reset means after said second control means is actuated and controlled by said pulse generating means to operatively connect both said delay means and control means to said gate reset means.

7. In a welding control device the combination of: a plurality of welding stations; direct current supply means to supply welding current to the respective welding stations; gate means each including a trigger pulse actuated solid state device to gate welding current from said current supply means to the respective said welding stations; said current supply means connected to bias all said gate means with sufficient voltage stress to cause said gate means to be in the low impedance condition when and subsequent to being pulsed by a trigger pulse; gate resetting means to superpose a pulse of opposite potential on said current supply means to momentarily cause the voltage stress at all said gates to be below the voltage stress required to maintain said gates in a low impedance condition; pulse generating means; counter means connected to advance upon being pulsed by said pulse generating means; trigger pulse emitting means comprising said counter means to sequentially issue a trigger pulse to said gate means; and delay means connected to said pulse generating means to actuate said gate resetting means after each pulse from said pulse generating means; said delay means having a delay shorter than the time differential between pulses from said pulse generating means.

8. A welding proportioner and control circuit comprising: a source of direct current power; a plurality of welding stations each operable from said source of welding power; a sequential ring counter; first gate means connected to said ring counter to sequentially cause selected welding stations to be connected to the source of welding power; pulse generating means to cause the advancement of said ring counter; pulse delay means connected to said pulse generator to provide a pulse output after a predetermined time delay; said predetermined time delay being less than the time interval between pulses from said pulse generating means; second gate means connected to close upon being pulsed by said delay means; capacitive storage means; and means to charge said storage means; said first gate means operative to cause said second gate means to change to the unlatched condition when said first gate means is changed from a latched to unlatched state.

9. In an electrical control for high energy devices the combination of: a source of direct current to supply electrical energy to the device; gate means to operably connect electrical energy to the device; pulse generating means operable to provide a pulse at regular intervals; each pulse from said pulse generating means being operably connected to open said gate means; control means operable to close said gate means; delay means connected to said pulse generating means to actuate said control means a predetermined time delay after each pulse from said generating means; said gate means being biased in an open condition by current flow from said direct current supply source; said control means including means to impose a series induced pulse of opposite potential between the direct current source and said gate means to momentarily lower the bias of said gate means below that necessary to maintain the gate means in the on condition.

10. In an electrical control for high energy devices the combination of: a source of direct current to supply electrical energy to the device; gate means to operably connect electrical energy to the device; pulse generating means operable to provide a pulse at regular intervals; each pulse from said pulse generating means being operably connected to open said gate means; control means operable to close said gate means; delay means connected to said pulse generating means to actuate said control means a predetermined time delay after each said pulse from said generating means; said time delay being shorter than the time intervals between pulses from said pulse generating means; said gate means being biased in an open condition by current flow from direct current supply; said control means including means to impose a series induced pulse of opposite potential between the direct current supply and said gate means to momentarily lower the bias of said gate means below that necessary to maintain the gate means in the on condition.

11. In a control circuit for controlling high energy electrical current to a device comprising: first gate means connected to latch and unlatch the electrical power to the device; pulse generating means to cause said first gate means to open; delay means connected to said pulse generating means to provide pulse output after a predetermined time delay; second gate means connected to be changed to the latched position upon being pulsed by said delay means; capacitive storage means; means to charge said storage means; said second gate means connected to discharge said capacitive storage means in series opposition to the direct current to cause said first gate means to be unlatched; said first gate means operative to cause said second gate means to change to the unlatched condition when said first gate means is changed from a latched to an unlatched state.

References Cited by the Examiner

UNITED STATES PATENTS

| | | | |
|---|---|---|---|
| 1,230,357 | 6/17 | Woodrow | 219—110 |
| 1,288,589 | 12/18 | Hood | 219—110 |
| 2,024,019 | 12/35 | Wright | 219—110 |
| 2,039,851 | 5/36 | Silverman | 171—97 |
| 2,046,969 | 7/36 | Redmond | 219—91 |
| 2,066,929 | 1/37 | Dawson | 219—108 |
| 2,115,827 | 5/38 | Powell | 307—132 |
| 2,144,033 | 1/39 | Root | 307—112 |
| 2,167,553 | 7/39 | Sciaky | 171—95 |
| 2,305,773 | 12/42 | Hagedorn | 171—97 |

FOREIGN PATENTS 686,611  1/53  Great Britain.

LLOYD McCOLLUM, *Primary Examiner.*

RICHARD M. WOOD, MILTON O. HIRSHFIELD,
*Examiners.*